Patented Mar. 31, 1925.

1,531,990

UNITED STATES PATENT OFFICE.

FRANK N. SPELLER, OF PITTSBURGH, PENNSYLVANIA.

WATER-DEACTIVATING BRIQUETTE AND METHOD OF MAKING SAME.

No Drawing. Application filed March 28, 1922. Serial No. 547,547.

*To all whom it may concern:*

Be it known that I, FRANK N. SPELLER, a citizen of the United States, and resident of Pittsburgh, in the county of Allegheny and State of Pennsylvania, have invented a new and useful Water-Deactivating Briquette and Method of Making Same, of which the following is a specification.

This invention relates to a water deactivator and method of making same and more particularly to a water deactivator including ferrous hydroxide, and has for its principal object the production of ferrous hydroxide in a commercial form, capable of being handled without serious oxidation in the atmosphere.

Another object is to provide a ferrous hydroxide deactivating compound that will not harden the water in which it is used.

Heretofore it has not been possible to manufacture ferrous hydroxide in a commercial form, since it is slightly soluble in water and oxidizes rapidly when exposed to the atmosphere. Ferrous hydroxide has been manufactured under water and thus it has been kept practically free from oxidation, but due to the bulk and weight of the package necessary to ship the product while it is under water this practice has not become widely used and is impracticable when large quantites are used such as is necessary to deactivate large amounts of water.

The present invention has overcome the above disadvantages and provides a product including ferrous hydroxide for deactivating water in such form that it will not be subject to serious oxidation in the atmosphere.

In carrying out my invention I produce ferrous hydroxide from commercial ferrous sulfate and caustic soda by intimately mixing the ferrous sulfate and caustic soda together mechanically in granular form. As is well known by all those skilled in the art, all crystallized or granular commercial ferrous sulfate, caustic soda and similar substances contain a certain amount of water of crystallization. When the ferrous sulfate and caustic soda are intimately mixed the reaction of said salts causes the water to be released, resulting in the evolution of heat and the formation of a thick mortar, composed principally of ferrous hydroxide. The so formed mortar is then shaped into briquettes and allowed to set, forming rigid, hard briquettes, which will not readily oxidize in the atmosphere, may be readily handled, and which will readily break up into fine flakes of ferrous hydroxide when immersed in water. The fine flakes of ferrous hydroxide thus liberated in water are very active in deactivating the water. That is, they will absorb the active oxygen in the water.

The advantage of a ferrous hydroxide deactivating product, which may be readily handled without danger of excessive oxidation, and which will readily break up into fine flakes when immersed in the water to be deactivated will be readily appreciated by those skilled in the art to which this invention belongs.

I claim:—

1. The method of forming a ferrous hydroxide composition which consists in mechanically mixing granular ferrous sulphate with granular caustic soda, the reaction of said salts causing the evolution of heat and forming a thick mortar having a ferrous hydroxide content.

2. The method of forming a ferrous hydroxide composition which consists in mechanically mixing granular ferrous sulphate with granular caustic soda, the reaction of said salts causing the evolution of heat and forming a thick mortar composed essentially of ferrous hydroxide.

3. The method of forming a ferrous hydroxide water deactivator, which consists in mechanically mixing commercial granular ferrous sulphate with commercial granular caustic soda, the reaction of said salts causing the evolution of heat and forming a thick mortar having ferrous hydroxide content, and allowing said mortar to set and thereby form a rigid, hard material adapted to break up into fine flakes of ferrous hydroxide when immersed in water.

4. The method of forming a ferrous hydroxide water deactivator, which consists in mechanically mixing commercial granular ferrous sulphate with commercial granular caustic soda, the reaction of said salts causing the evolution of heat and forming a thick mortar having a ferrous hydroxide content, forming briquettes from said mortar, and allowing said briquettes to set and thereby form rigid, hard briquettes adapted to slowly dissolve or disintegrate when immersed in water.

5. As an article of manufacture, a briquette composed essentially of ferrous hydroxide.

6. As an article of manufacture, a briquette composed of the product resulting from the mechanical mixing of ferrous sulphate and caustic soda.

In testimony whereof I have hereunto signed my name.

FRANK N. SPELLER.